United States Patent Office 2,693,668
Patented Nov. 9, 1954

2,693,668

POLYPHASE SYSTEMS OF GLASSY MATERIALS

Games Slayter, Newark, Ohio, assignor to Owens-Corning Fiberglas Corporation, Toledo, Ohio, a corporation of Delaware No Drawing. Application April 3, 1951,
Serial No. 219,112

10 Claims. (Cl. 49—92)

This invention relates to the manufacture of a new composition of matter and it relates more particularly to the composition of matter based upon a heterogeneous, highly stressed system consisting of a dispersed phase, preferably in fibrous form, randomly arranged or oriented within another phase or phases, which may exist in fibrous form or as a matrix.

It is an object of this invention to produce a composition of matter of the type described and to provide a method for producing the same.

Another object is to produce a composition of matter in the form of a polyphase system wherein at least one of the phases exists as a dispersed fibrous phase randomly arranged or oriented within a continuous phase or matrix with the phases existing in what is termed "volume stressed" condition.

A further object is to produce a composite structure of inorganic materials based upon a heterogeneous glass system wherein at least one of the phases comprises a glass composition in fibrous form distributed in a glass matrix with the fibrous phase being under tension while the matrix is under compression and it is a related object to provide a glass in glass system of the type described in which the phases are strongly bonded one to another but with a minimum amount of diffusion therebetween.

A still further object is to produce a heterogeneous system of the type described into which a stressed condition is introduced by reason of dissimilar characteristics of the phase materials of which it is formed and not by techniques which have heretofore been employed for producing high strain in isometric systems, such as by supercooling or by stretching as in glass or resinous bodies.

The criteria for the practice of this invention resides in the preparation of a heterogeneous system of phases which are strongly bonded one to another but are substantially dissimilar in their coefficience of thermal expansion. Thus upon change of temperature, such as upon cooling of the phases from working temperature, the phase having the higher coefficient tends to contract more than the other with the result that the phase with the higher coefficient is placed under tension while the phase with the lower coefficient is under contraction. At least one of the phases, and preferably the phase having the higher coefficient, should be in fibrous form dispersed or oriented within the other phase or phases which may be in fibrous form but preferably in the form of a continuous phase, such as a matrix.

When the phases are formed of materials incapable of diffusion, such as of metal and glass, metal and ceramics or some glasses in ceramics or some plastics in plastics, it is sufficient to rely on the differences in coefficient of thermal expansion as the criteria to be followed in the practice of this invention. Otherwise, it is necessary that the materials have a difference also in surface tension in the event that they are to be worked together at flowable temperature so as to minimize diffusion of one phase into another and assist fiberization. Where differences in surface tension are relied upon, it is preferred that the fibrous phase having the higher coefficient of thermal expansion also have the higher surface tension. Where diffusion takes place, notwithstanding difference in surface tension, it is expedient to reduce the temperature and time of working to limit diffusion to interfacial areas which may serve as the area or integration of the phases of dissimilar expansion and contraction. It will be sufficient if the differences of coefficient of thermal expansion between phases are in the order of 50 percent but, as a general rule, it may be stated that the greater the difference the better.

Coupled with such differences in coefficient of thermal expansion, if differences also exist between phases in their modulus of elasticity, the strength properties will be still further increased and the rapid propagation of cracks, characteristic of isotropic systems, will be substantially absent unless the applied force is sufficient to rupture the phase having the higher strength before the force has been sufficiently dissipated. As a matter of fact, when, as is preferred, the fibrous phase also has the higher modulus, the fibers are in position to take the load before the phase of lower modulus reaches its elastic limit thereby to stop the formation of cracks in the first instance even in response to load which might ordinarily have been expected to rupture the latter material in an isotropic system. In the event that the initial load is sufficient to cause the formation of cracks in the phase having lower modulus and lower strength, it will be apparent that the crack will stop before it has migrated beyond the fibrous phase which receives the load and causes its dissipation. Thus the migration of cracks will be stopped before they travel far into the composite body.

The criteria for this invention are particularly well adapted for systems of glass in glass wherein one glass having the higher coefficient of thermal expansion is dispersed, preferably as a fibrous phase, with or without orientation, in a glass matrix having the lower coefficient of thermal expansion. Unless the fibrous phase is formed as by distribution with a frit or powder or other glass or ceramic material which is subsequently fused to form the matrix, the glass phases should be formed of materials having similar working ranges. Under such circumstances, the phases should either be incompatible though capable of strong bond with the other, or else should have sufficient difference in surface tension to minimize diffusion.

A composite structure embodying the concepts of this invention provides a new composition of matter which makes glass compositions available as a structural material characterized by higher strength properties than have heretofore been considered possible. Thus glass fibers which have excellent strength properties in themselves can now be embodied in a composite structure in which the high strength of the glass fibers is not only made available but by the process of introducing a volume stressed condition still greater strengths are developed in the composite mass. In addition it is possible to incorporate high resistance to impact, heat shock and resistance to the propagation of cracks through the body so as to minimize failure. For the first time, the excellent properties inherent in glass, that is their inertness to attack by solvents, chemicals, oxidation and elements normally existing in the atmosphere and the like, coupled with their excellent heat and electrical insulation characteristics, transparency and non-inflammability are made available in a high strength structural material.

Having set forth the concepts of this invention, description will now be made to the various techniques by which they may be carried into practice in the manufacture of new compositions of matter. For purposes of illustration, description will be made to the practice of the invention in systems formed of glass in glass using two representative glass compositions having differences in coefficient of thermal expansion and differences in surface tension. It will be understood that other glass or ceramic compositions, at least one of which should be capable of fiber formation, may be substituted for one or both of the glass compositions hereinafter described so long as the criteria heretofore set forth are followed in the selection of such glass compositions.

GLASS COMPOSITION A

| | Percent |
|---|---|
| Silica ($SiO_2$) | 50–60 |
| Aluminum oxide ($Al_2O_3$) | 12–16 |
| Boron oxide ($B_2O_3$) | 9–11 |
| Calcium oxide (CaO) | 16–19 |
| Magnesium oxide (MgO) | 3–6 |

Glass formed of the above composition may be worked in a temperature range of about 2000–2800° F. and has a coefficient of thermal expansion of about $55 \times 10^{-7}$.

GLASS COMPOSITION B

| | Percent |
|---|---|
| Silica ($SiO_2$) | 40 |
| Aluminum oxide ($Al_2O_3$) | 33 |
| Boron oxide ($B_2O_3$) | 10 |
| Calcium oxide (CaO) | 13.5 |
| Magnesium oxide (MgO) | 3.5 |

Glass formed of the above composition may be worked at a temperature within the range of 2100–2900° F. and has a coefficient of thermal expansion of about $33 \times 10^{-7}$.

There are a number of ways in which the two or more glasses or other materials may be combined to form the heterogeneous, polyphase system embodying the features of this invention. The following examples of fabrication are given by way of illustration and not by way of limitation:

Example 1

Each of the compositions A and B may be separately processed as by melting to temperatures within the range prescribed to form their respective glasses. Such glasses which are separately prepared are then reduced to finely divided form, such as to a particle size of about 0.004 inch. The particles of A glass and B glass are then mixed together in amounts to provide a minimum of 10 percent of A glass in B glass or 10 percent B glass in A glass but such glasses are preferably combined in the ratio of about 40–60 percent by weight A glass and 60–40 percent by weight B glass.

The mix of A glass and B glass is heated to a temperature of about 2550–2650° F. for a time sufficient to reduce all of the particles to flowable state but insufficient to enable diffusion of one glass into the other to any great extent. While in flowable condition, the mass is rolled or otherwise formed into thin sheets as a result of which substantially all of the glass particles are drawn out into fibers apparently bonded together by slight fusion between phases to form a solid body.

Instead of rolling or working the flowable composition into sheet form, the heterogeneous glass composition may be drawn or otherwise attenuated into fibers, a cross section of which will be formed of highly stretched fibers of each of the glass compositions in substantially orientated but separate phases and with apparently sufficient fusion between the fibrous phases at their surfaces to integrate the fibers one to another in the formation of a composite mass.

When reduced to room temperature, the fibers formed of A glass having the higher coefficient of thermal expansion will be under tension while the fibers formed of B glass will be under compression such that a volume stressed condition will exist in the final product to impart greater strength and higher resistance to thermal or mechanical shock. In the event that the product is subsequently exposed to any type of heat treatment, such volume stressed condition will remain because of the differences in coefficient of thermal expansion between phases. Heat treatment has been used to improve the characteristics of the composite mass by exposure of the structure for a few seconds up to one hour, depending upon the mass, at about 1200° F.

Example 2

Glass formed of composition A, having the higher coefficient of thermal expansion, may be fed in finely divided form into composition B maintained at a melting temperature of about 2600° F. Upon introduction of glass A, the mix is vigorously stirred for the purpose of distributing and simultaneously stringing out glass A particles into fine fibers. The mass may be cooled before excessive diffusion between glass phases takes place so that the final product will contain fibers of glass A substantially uniformly distributed or arranged in a swirl-like pattern in a matrix of glass B.

The fibers of glass A will be strongly bonded or integrated by slight diffusion with the matrix of glass B such that upon cooling to set condition, glass A fibers will be placed under tension and glass B matrix will correspondingly be placed under compression.

Example 3

A melt maintained at about 2550° F. and formed of glass A intimately dispersed with glass B may be strung out by pouring slowly from a distance to form a paddy or the like in which the strung out glass compositions are solidified into a composite product or else the molten products may be attenuated into fine fibers by drawing the melt through fine orifices or the like. Thus it will form the glass compositions in which glass A will be arranged in substantially lengthwise orientation within the matrix of glass B which may also exist in fibrous form.

The ratio of glasses which may be used is not critical but excellent results have been secured when glass A and glass B are present in substantially equal proportions but, in any event, at least 10 percent glass A should be present in the final product and it is preferred to have glass A present in amounts ranging from 10–50 percent by weight.

Example 4

A glass composition embodying the concepts of this invention may be produced by intimately mixing crushed particles of glass formed of composition A with crushed particles of glass formed of composition B present in substantially equal proportions. The mixture of glass particles are reduced to molten condition when heated to a temperature of about 2500° F. in a pot that is slowly rotated at about 1⅓ revolutions per minute and which is tilted at an angle during rotation at about 12 degrees. Melting and distribution may be carried out for ½ to 2 hours depending upon the particle size of the crushed glass particles and when the product is cooled to room conditions, it will be found that the composite solid mass has fine cords of A glass uniformly distributed substantially in a swirl pattern within a matrix of B glass. A polished section of glass so prepared reveals a network of very finely divided and well distributed cords which appear as fibrous elements formed of A glass intimately bonded and integrated with B glass.

The product exhibits exceptionally high strength and resistance to mechanical or thermal shock. It appears that cracks which form under applied load in the matrix of B glass are arrested as soon as they contact portions of A glass distributed therein with the result that cracking is arrested before deep penetration into the composite structure.

The properties of the heterogeneous glass composition produced in this manner may be further improved by exposure to a temperature of about 1200° F. for a time ranging from a few minutes to a couple of hours, depending upon the mass.

By way of comparison, an isotropic glass corresponding to that prepared by composition A reduced to 40–60 mesh and processed under similar conditions for ½ hour at 2550° F. followed by the described exposure to a temperature of about 1200° F. for one hour, has an impact strength of 0.586 foot pound per inch, whereas a glass prepared in accordance with this example of glass particles reduced to mesh size of 40–60 and processed for ½ hour at 2550° F. followed by heat treatment gives an impact strength of 1.267 foot pounds per inch.

Instead of solidifying the cordy glass to produce the described composite mass, the melt of cordy glass may be strung out by pouring or by drawing through orifices to produce fibers wherein the A glass of higher coefficient of expansion exists in endwise orientation within a matrix of B glass.

Example 5

Glass formed of composition A may be heated to flowable condition at a temperature of about 2500° F. and poured in a continuous fine stream into a molten mass of glass formed of composition B and maintained at a melt temperature of 2600° F. The mixture of the two glasses are maintained at a temperature wherein flow can take place but at which the diffusion of the two glasses is held to a minimum. While glass A is being poured into glass B, the mass is stirred so that glass A is formed into striated conditions within the mix which may be allowed to set or else molded, blown or otherwise attenuated to form a finished product in which glass A will appear in fibrous form in a matrix of glass B.

Example 6

A molded product may be prepared directly of the two glass systems comprising equal proportions of glass formed of composition A with glass formed of composition B by crushing the glasses to fine particle size, mixing the particles of crushed glass, and then heating the mixture sufficiently at a temperature within the range of 2500–2700° F. to reduce the mixture of glasses to flowable consistency but below a temperature at which diffusion takes place in substantial proportions. The flowable mass of mixed glasses is then attenuated in a ratio of about 100–1000 to 1 as the mixed glasses are poured in an endless stream from a ladle into a mold having the desired contour. Means may be provided for folding the attenuated fibrous substances back and forth as they collect in the mold so that the composite product having mold shape will be in the form of a heterogeneous composition formed of a fibrous phase extending substantially in all directions within a matrix and will thereby exhibit high strength in substantially every direction.

By way of further modification composite glass structures embodying the concepts of this invention may be prepared of glass compositions which are substantially immiscible within each other, such as the systems based upon silicon oxide-calcium oxide and boron oxide. Representative of such immiscible glass systems are the following two glass compositions which are given by way of illustration, and not by way of limitation, for purposes of illustrating the practice of this invention with such incompatible systems:

GLASS COMPOSITION C

| | Percent |
|---|---|
| Silicon dioxide ($SiO_2$) | 31.7 |
| Calcium oxide (CaO) | 19.8 |
| Boron oxide ($B_2O_3$) | 48.5 |

GLASS COMPOSITION D

| | Percent |
|---|---|
| Silicon dioxide ($SiO_2$) | 12.9 |
| Calcium oxide (CaO) | 12.2 |
| Boron oxide ($B_2O_3$) | 74.9 |

*Example 7*

The two glasses formed of composition C and composition D may be reduced to finely divided form to accelerate melting at about 2550° F. and maintained at this temperature until reduced to molten condition whereupon the composition may be stirred to cause the dispersion of one melt within another followed by cooling to produce cordy glass or by attenuation in the manner described to produce fibers of the two glasses in intimate mixture with the glasses well bonded one to another to introduce the desired volume stressed condition. The temperature and time of heating with compositions of the type described are not critical in view of the fact that the glasses are immiscible and therefore substantially retain their individual identity for dispersion and attenuation by normal processes.

The concepts of this invention may also be practiced in a glass in glass system wherein one glass is produced as a core arranged within a skin or sheath of another glass composition having sufficient difference in composition and coefficient of thermal expansion to provide the desired adhesion and tension between the core and the skin in the final product. The following illustrates the manufacture of glass structures embodying the above arrangement of materials:

*Example 8*

Glass fibers of substantial dimension, such as a fiber formed of glass composition A having a diameter of 0.020 inch, hereinafter referred to as the primary fiber, may be leached in suitable acids or acidic compositions to a depth of about 0.001 to 0.01 inch so that the center core and the outer layer will be of dissimilar composition. The leaching solution is rinsed from the surface of the glass fibers which are then refired for glazing and flame-drawn to fibers of finer dimension having a core of one glass composition and a sheath of another.

*Example 9*

Another system for producing glass fibers formed with a core of one composition and a skin or sheath of another may be achieved by arranging one bushing within another, the inner one having an orifice in the underside which is concentric within the orifice of the outer bushing. Glass such as glass formed of composition A may be reduced to molten condition in the outer bushing and glass B reduced to molten condition within the inner bushing so that the two glass compositions may be simultaneously drawn through the orifice whereby a sheath of glass B will be formed onto a core of glass A as the two glass compositions are simultaneously drawn from the bushing.

By way of further illustration, the following glasses may be substituted for glasses A and B in the above example and in other examples previously described.

GLASS COMPOSITION E

| | Percent |
|---|---|
| Silicon dioxide | 28.7 |
| Calcium oxide | 4.5 |
| Boron oxide | 26.3 |
| Sodium oxide | 11.7 |
| Calcium fluoride | 6.4 |
| Zinc oxide | 5.3 |
| Strontium oxide | 17.2 |

The above glass composition has a melting point of around 1550° F. and a thermal expansion of about $8 \times 10^{-7}$. It has been used to form the shield or skin about a center core formed of glass composition F which is as follows:

GLASS COMPOSITION F

| | Percent |
|---|---|
| Silicon dioxide | 29.8 |
| Alumina | 6.1 |
| Calcium oxide | 2.1 |
| Sodium oxide | 12.9 |
| Potassium oxide | 2.2 |
| Lead oxide | 38.4 |
| Boron oxide | 8.2 |

The above glass composition has a melting point within the range of 1550° F. and a coefficient of thermal expansion of about $120 \times 10^{-7}$.

*Example 10*

Instead of forming the fibrous phase at the same time that the matrix is formed, the concepts of this invention may be practiced by distributing glass fibers cut to desired lengths with powders of a glass or ceramic composition having lower melting point and provided with suitable temporary binder such as glucose, starch, bentonite or clays to secure the glass fibers and powder in an intimate mixture until the powdery constituents are fused at elevated temperature to seal the fibers in the desired distribution within the formed matrix.

For example, glass fibers formed of composition E having a melting point in the range of around 2550° F. may be mixed with a glass powder formed of composition F having a melting point of around 1550° F. or with a powder formed of a lead borate glass having a composition of 70 parts by weight boron oxide and 30 parts by weight lead oxide having a melting point less than 1500° F. It will be sufficient if 10–50 percent by weight fiber is mixed with the low melting glass powder and 10 per cent temporary binder may be used to secure the particles together until fusion of the low melting point glass composition takes place.

Glass-ceramic compositions embodying features of this invention may be prepared in the fashion corresponding to the systems described for glass in glass. In some instances modified practices may be employed which are closely related to that set forth for glass in glass compositions prepared in accordance with Example 10.

*Example 11*

Strands of glass fibers formed of glass composition A may be impregnated with a suspension of finely divided bentonite or frit to deposit about equal proportions of bentonite in uniform distribution amongst the glass fiber surfaces. The particles of bentonite may be temporarily bonded to the glass fiber surfaces by starch or glucose and the temporary binder is generally removed upon heating to processing conditions wherein the bentonite and fibers are reduced to flowable condition, such as at a temperature within a range of 1800–2500° F. Under these conditions the bentonite particles become integrated with the glass fibers and are attenuated as the strands of glass fibers are drawn to still finer dimension to form the desired composite structure having the glass fibers strongly bonded to the bentonite which forms the matrix. Heating should be maintained at a temperature below that at which substantial diffusion can take place but above the temperature of flow for the respective components.

Example 12

In another system, rods may be formed of grog or finely divided glass corresponding to compositions A or B with clay or bentonite as the binder. The materials may be present in the ratio of about 30–70 parts by weight glass to 30–70 parts by weight binder. The formed rods are heated to fusion temperature within the range of 2000–2500° F. and fiberized. It is preferred first to preheat the rods for effecting partial fusion or a combination of the materials but without heating so high as to cause substantial diffusion. In a system of this type, sufficient adhesion exists between the glass particles and the clay particles to effect simultaneous attenuation while the compositions maintain their individual identity as the rod is drawn down to substantially fine fiber dimension. In the final product, the particles of glass are attenuated into fibers which are bonded one to the other with the clay binder which constitutes the matrix which may also assume the form of fibrous elements.

As used herein, the term "glassy material" will be understood as including ceramic substances capable of fusion and working in the manner described for glass.

It will be understood that changes may be made in the composition of various components employed in the formation of the non-homogeneous system limited only by the concepts of this invention without departing from the spirit thereof, as set forth in the following claims.

I claim:

1. A composite structure comprising a heterogeneous system formed of substantially separated phases of glassy material having substantially similar working temperature ranges and strongly bonded one to another at their interfaces but with substantial differences between their coefficients of thermal expansion with one of the phases comprising a matrix of fused glass with the other phase being present in fibrous form uniformly dispersed throughout the matrix.

2. A composite structure comprising a heterogeneous system formed of substantially separated phases of glassy material having substantially similar working temperature ranges and strongly bonded one to another but which differ in their coefficient of thermal expansion and surface tension with one of the phases having the higher coefficient existing in the form of fibers and the other comprising a matrix of fused glass in which the fibrous phase is uniformly dispersed.

3. A composite structure comprising a heterogeneous system formed of substantially separated phases of glassy material strongly bonded one to another but which differ in their coefficient of thermal expansion and modulus of elasticity with one of the phases existing as a matrix of fused glass and the other having a higher coefficient of thermal expansion existing in fibrous form uniformly dispersed throughout the matrix.

4. A composite structure comprising a heterogeneous system formed of substantially separated phases of glassy material strongly bonded one to another but which differ in their coefficient of thermal expansion, surface tension and modulus of elasticity with the phase having the higher coefficient existing in fibrous form and the other comprising a matrix of fused glass in which the fibrous phase is uniformly dispersed.

5. A composite structure comprising a heterogeneous system formed of substantially separated phases of glassy material strongly bonded one to another but which differ in their coefficient of thermal expansion with one of the phases existing as a matrix of fused glass and another existing in fibrous form uniformly dispersed throughout the matrix, the phase having the higher coefficient being under tension while the phase having the lower coefficient is under compression.

6. A composite structure comprising a heterogeneous system formed of substantially separated phases of glassy material strongly bonded one to another but which differ in their coefficient of thermal expansion so that the phase having the higher coefficient is under tension and the phase having the lower coefficient is under compression, one of the phases having the lower coefficient being present as a matrix of fused glass and another phase having the higher coefficient existing in fibrous form uniformly dispersed throughout the matrix and present in amounts of at least 10 percent by weight.

7. A composite structure as claimed in claim 6 in which the fibrous phase having the higher coefficient is present in amounts ranging from 10–60 percent by weight and the other phase having the lower coefficient is present in amounts ranging from 90–40 percent by weight.

8. A composite structure comprising a heterogeneous system formed of dispersed phases of glassy material strongly bonded one to another but which differ in their coefficient of thermal expansion with the phase having the higher coefficient existing in fibrous form and present in amounts ranging from 10–60 percent by weight while the phase having the lower coefficient exists in the form of a matrix in which the fibrous phase is uniformly dispersed and which is present in amounts ranging from 90–40 percent by weight, the phase having the higher coefficient being under tension and the phase having the lower coefficient being under compression.

9. A composite structure comprising a heterogeneous system formed of dispersed phases of glassy material having substantially similar working temperature ranges and strongly bonded one to another but which differ in their coefficient of thermal expansion and surface tension with the phase having the lower coefficient existing as a matrix of fused glass and with the phase having the higher coefficient in fibrous form uniformly dispersed throughout the matrix with the fibrous phase under tension and the matrix under compression.

10. A composite structure comprising 10–60 percent by weight of glass fibers dispersed in 90–40 percent by weight of a glass matrix, the glassy phases differing in their coefficient of thermal expansion but being strongly bonded one to another to form a composite structure in which the fibrous phase exists under tension and the matrix is under compression.

References Cited in the file of this patent

UNITED STATES PATENTS

| Number | Name | Date |
|---|---|---|
| 1,051,637 | Rodman | Jan. 28, 1913 |
| 1,117,601 | Porter | Nov. 17, 1914 |
| 1,173,688 | Thomson | Feb. 29, 1916 |
| 1,529,947 | Freese | Mar. 17, 1925 |
| 1,556,364 | Smith | Oct. 6, 1925 |
| 2,197,562 | Reinker | Apr. 16, 1940 |
| 2,271,829 | Powers | Feb. 3, 1942 |
| 2,301,062 | Long | Nov. 3, 1942 |
| 2,311,613 | Slayter | Feb. 16, 1943 |
| 2,313,296 | Lamesch | Mar. 9, 1943 |
| 2,331,945 | Pazsiczky et al. | Oct. 19, 1943 |
| 2,500,105 | Weber | Mar. 7, 1950 |